United States Patent
Dettoni et al.

(10) Patent No.: US 6,428,083 B2
(45) Date of Patent: Aug. 6, 2002

(54) LIGHTWEIGHT SUSPENSION PANEL FOR VEHICLE SEATS

(75) Inventors: Kristen Ann Dettoni; William Michael Rose, both of Durham, NC (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/498,915

(22) Filed: Feb. 4, 2000

Related U.S. Application Data

(62) Division of application No. 09/307,210, filed on May 7, 1999.

(51) Int. Cl.[7] .............................. B60J 5/00; B32B 3/06; B32B 3/20; B32B 3/26; B32B 5/22

(52) U.S. Cl. .................... 296/146.7; 296/191; 160/264; 428/317.9; 428/188; 428/322.7

(58) Field of Search .............................. 296/191, 146.7; 160/264, 383, 385, 388; 428/316.6, 317.9, 188, 322.7

(56) References Cited

U.S. PATENT DOCUMENTS

| | | | | |
|---|---|---|---|---|
| 2,198,885 A | * | 4/1940 | Price ....................... 428/316.6 |
| 2,251,318 A | * | 8/1941 | Blair et al. |
| 2,325,992 A | * | 8/1943 | Wirthman ................... 160/264 |
| 2,657,645 A | * | 11/1953 | Ecoff ........................ 296/191 |
| 2,738,834 A | * | 3/1956 | Jaffe et al. ...................... 5/420 |
| 2,865,436 A | | 12/1958 | Thorne .................. 297/440.11 |
| 3,024,068 A | | 3/1962 | Eames ................... 297/452.13 |
| 3,175,269 A | | 3/1965 | Raduns et al. ....... 297/452.63 X |
| 3,273,180 A | * | 9/1966 | Feinerman ................... 5/655.9 |
| 3,294,602 A | * | 12/1966 | Francis et al. ............ 428/316.6 |
| 3,389,043 A | * | 6/1968 | Clark .......................... 428/102 |
| 3,399,671 A | * | 9/1968 | Satas ........................ 428/316.6 |
| 3,499,848 A | * | 3/1970 | Weisman ..................... 264/45.3 |
| 3,544,417 A | * | 12/1970 | Corzine .................... 428/316.6 |
| 3,563,837 A | * | 2/1971 | Smith et al. ..................... 428/71 |
| 3,648,306 A | * | 3/1972 | Auerbach ......................... 5/94 |
| 3,679,263 A | * | 7/1972 | Cadiou ........................ 297/456 |
| 3,966,522 A | * | 6/1976 | Hatch et al. ................. 156/148 |
| 4,015,641 A | * | 4/1977 | Goff, Jr. et al. ............. 139/384 |
| 4,197,342 A | * | 4/1980 | Bethe .......................... 428/159 |
| 4,237,181 A | * | 12/1980 | Tanabe et al. ........... 428/322.7 |
| 4,454,187 A | * | 6/1984 | Flowers et al. .......... 428/316.6 |
| 4,479,994 A | * | 10/1984 | Berg .......................... 428/195 |
| 4,541,885 A | * | 9/1985 | Caudill, Jr. ................. 156/220 |
| 4,545,614 A | * | 10/1985 | Abu-Isa et al. |
| 4,558,904 A | | 12/1985 | Schultz .................. 297/440.11 |
| 4,665,606 A | * | 5/1987 | Saito et al. |
| 4,685,738 A | | 8/1987 | Tinus |
| 4,702,522 A | * | 10/1987 | Vail et al. |
| 4,723,816 A | * | 2/1988 | Selbert et al. |
| 4,890,877 A | * | 1/1990 | Ashtiani-Zarandi et al. .......... 296/146.7 |

(List continued on next page.)

FOREIGN PATENT DOCUMENTS

| | | | | |
|---|---|---|---|---|
| EP | 0288274 | * | 10/1988 | |
| FR | 2232655 | * | 1/1975 | ................. 160/264 |
| GB | 1023959 | * | 3/1966 | ................. 296/191 |
| GB | 1 300 417 | * | 12/1972 | |
| JP | 2-74755 | * | 3/1990 | |
| JP | 406107235 A | * | 4/1994 | ................. 296/191 |

*Primary Examiner*—Stephen T. Gordon
*Assistant Examiner*—H. Gutman
(74) *Attorney, Agent, or Firm*—Myers Bigel Sibley & Sajovec

(57) ABSTRACT

Resilient, contoured members for use in suspension seats and automobile interior door panels include first and second fabric panels joined together along respective perimeters thereof and along spaced-apart intermediate portions thereof to form one or more sets of internal passageways. Each internal passageway is filled with a resilient material such as polyurethane foam. The first and second fabric panels are formed from sets of flat-woven fibers.

7 Claims, 3 Drawing Sheets

U.S. PATENT DOCUMENTS

| | | | | |
|---|---|---|---|---|
| 4,910,817 A | | 3/1990 | Kita .................. 297/452.63 X | |
| 5,013,089 A | * | 5/1991 | Abu-Isa et al. | |
| 5,102,725 A | * | 4/1992 | Knox et al. | |
| 5,290,626 A | * | 3/1994 | Nishio et al. | |
| 5,318,348 A | | 6/1994 | Hess ..................... 297/440.11 | |
| 5,324,095 A | * | 6/1994 | Yamauchi | |
| 5,360,653 A | * | 11/1994 | Ackley ........................ 428/71 | |
| 5,372,868 A | * | 12/1994 | Prewo et al. ............... 428/167 | |
| 5,429,852 A | * | 7/1995 | Quinn | |
| 5,447,787 A | * | 9/1995 | Shaffer | |
| 5,501,891 A | * | 3/1996 | Saika et al. .................... 428/71 |
| 5,582,463 A | * | 12/1996 | Linder et al. |
| 5,603,647 A | * | 2/1997 | Van Adrichem et al. |
| 5,724,917 A | * | 3/1998 | Dodson et al. ............. 119/526 |
| 5,762,403 A | | 6/1998 | Robinson ........... 297/452.13 X |
| 5,851,626 A | * | 12/1998 | McCorry et al. ........ 296/146.7 |
| 5,888,616 A | * | 3/1999 | Ang .......................... 296/191 |
| 5,984,837 A | * | 11/1999 | Weaver et al. ............. 160/388 |
| 5,987,668 A | * | 11/1999 | Ackley .......................... 5/500 |

* cited by examiner

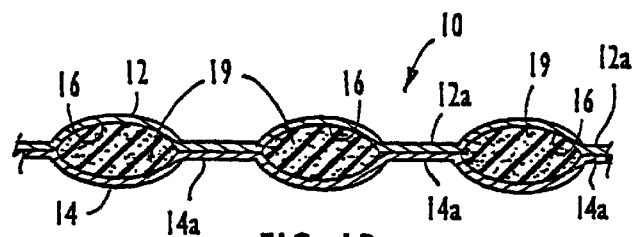
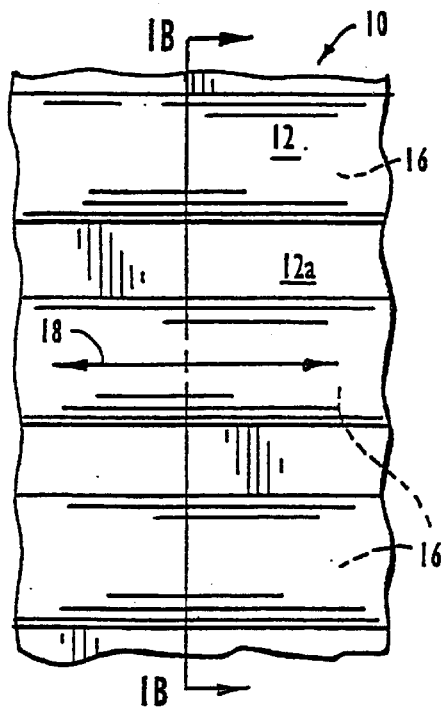
FIG. 1A.
FIG. 1B.
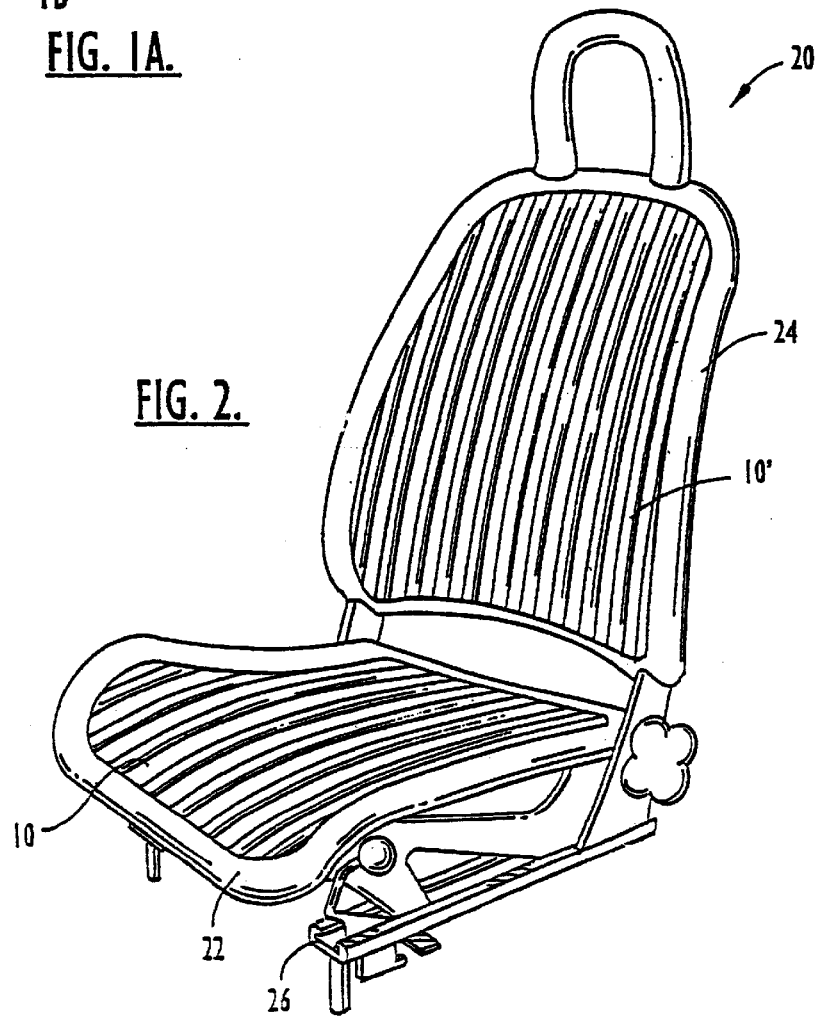
FIG. 2.

LIGHTWEIGHT SUSPENSION PANEL FOR VEHICLE SEATS

The present application is a divisional of U.S. Ser. No. 09/307,210 filed on May 7, 1999.

FIELD OF THE INVENTION

The present invention relates generally to vehicles and, more particularly, to passenger seats and interior door panels for vehicles.

BACKGROUND OF THE INVENTION

Conventional seats in passenger vehicles typically include a system of interrelated steel springs mounted to a frame upon which one or more cushions are placed to support the weight of a person sitting thereon. Unfortunately, conventional passenger vehicle seats can be somewhat heavy and bulky devices. Furthermore, little, if any, room may be available beneath conventional passenger vehicle seats for the purpose of storing articles.

With increasing emphasis being placed on increasing storage capacity within passenger vehicles, there is a need to provide passenger vehicle seats with storage space therebeneath. Also, with increasing emphasis being placed on reducing unnecessary weight in passenger vehicles, there is a need for lighter weight vehicle components including passenger seats. Furthermore, vehicle manufacturers are continuously looking for ways to reduce vehicle manufacturing and assembly costs.

Passenger vehicle seats referred to as "suspension seats" are known. For example, U.S. Pat. No. 5,013,089 to Abu-Isa et al. describes a passenger vehicle seat assembly having a frame and an integrated elastomeric filament suspension and fabric cover stretched across and attached to the frame to provide a low profile finished seat or back rest. Suspension seats can facilitate reducing vehicle manufacturing and assembly costs because various components, such as springs, can be eliminated. Unfortunately, suspension seats may not provide a passenger sitting thereon with as much comfort as traditional seats that utilize conventional springs and cushions.

Vehicle interior door panels conventionally include one or more structural members formed from rigid material, such as plywood or fiberboard, that are secured to the inside of a vehicle door. Various amounts of cushioning and sound-deadening material are secured to the interior face of these structural members. One or more layers of fabric typically cover the cushioning and sound-deadening material to provide an aesthetically pleasing appearance. Unfortunately, fabrication and assembly of conventional vehicle interior door panels may be somewhat material and labor intensive.

SUMMARY OF THE INVENTION

It is, therefore, an object of the present invention to facilitate reducing manufacturing and assembly costs associated with vehicle passenger seats and interior door panels.

It is another object of the present invention to provide lightweight passenger vehicle seats that are as comfortable to passengers as conventional vehicle seats utilizing cushions and springs.

It is another object of the present invention to facilitate increasing storage space beneath vehicle passenger seats.

These and other objects, according to one aspect of the present invention, are provided by a passenger seat for a vehicle that includes a frame configured to be secured within a passenger compartment of a vehicle and a resilient, contoured suspension member attached to the frame that is configured to support a person sitting in the seat. The resilient, contoured suspension member includes first and second fabric panels joined together along respective perimeters thereof. The first fabric panel is formed from a first set of flat-woven fibers and the second fabric panel is formed from a second set of flat-woven fibers that may be different from the first set of fibers.

The first and second fabric panels are also joined together along spaced-apart intermediate portions thereof to form one or more sets of internal passageways that extend along respective directions. Each internal passageway is filled with a resilient material such as polyurethane foam.

An important advantage of the present invention is that resilient, contoured suspension members, according to the present invention, can provide vehicle passengers with comfortable, yet firm, support and will not bottom-out when a vehicle encounters a rough road surface or goes over a bump. At the same time, the fabric panels encapsulating the resilient material within the internal passageways can provide an aesthetically pleasing appearance and can be readily assembled onto a seat frame. Accordingly, fabrication and assembly costs for vehicle seats incorporating the present invention may be reduced. Furthermore, increased storage space within a vehicle may be provided without sacrificing passenger comfort.

According to another aspect of the present invention, an interior trim panel for a vehicle door, includes a contoured member attached to an interior surface of a vehicle door. The contoured member includes first and second fabric panels joined together along respective perimeters thereof. The first fabric panel is formed from a first set of flat-woven fibers and the second fabric panel is formed from a second set of flat-woven fibers that may be different from the first set of fibers.

The first and second fabric panels are also joined together along spaced-apart intermediate portions thereof to form one or more sets of internal passageways that extend along respective directions. Each internal passageway is filled with a resilient material such as polyurethane foam.

Advantageously, rigid, durable and aesthetically pleasing vehicle interior door panels can be provided according to the present invention. The contoured panels according to the present invention may eliminate the need for separate supporting panels. Accordingly, fabrication and assembly costs for vehicle door interior trim panels incorporating the present invention can be reduced.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1A is a partial plan view of a contoured suspension member according to an embodiment of the present invention.

FIG. 1B is a section view of the contoured suspension member of FIG. 1A taken along lines 1B—1B.

FIG. 2 illustrates a vehicle passenger seat incorporating contoured suspension members according to the present invention.

DETAILED DESCRIPTION OF THE INVENTION

Figure 3:
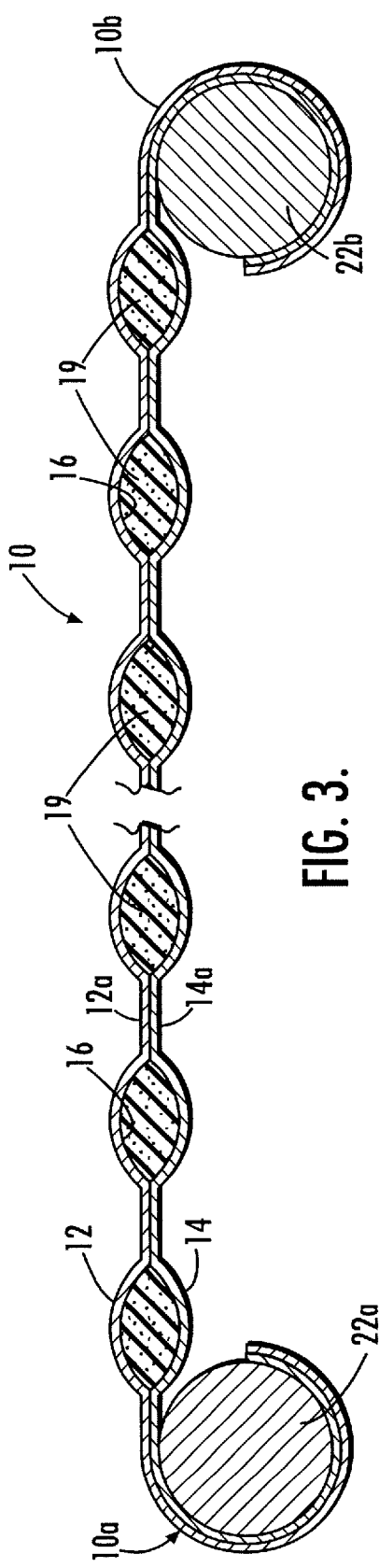
FIG. 3 is a side section view of a contoured suspension member according to the present invention wherein the contoured suspension member is secured to a passenger seat frame by overlapping opposing portions of the frame.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIGS. 1A and 1B, a resilient, contoured suspension member 10 according to an embodiment of the present invention is illustrated. The resilient, contoured suspension member 10 includes first and second fabric panels 12, 14 joined together, preferably along respective perimeters thereof. The first and second fabric panels 12, 14 may be joined together along respective perimeters thereof in various ways including, but not limited to, stitching and adhesives.

The first fabric panel 12 is preferably formed from a first set of flat-woven fibers, such as mono-filament and conventional fibers. The second fabric panel 14 is preferably formed from a second set of flat-woven fibers, such as mono-filament and conventional fibers. The first and second sets of flat-woven fibers may be different types of fibers, or may be similar types of fibers.

In the illustrated embodiment, the first and second fabric panels 12, 14 are also joined together along spaced-apart intermediate portions 12a, 14a thereof to form a first set of internal passageways 16 that extend along a respective direction (indicated by arrow 18). The first and second fabric panels 12, 14 may be joined together along the spaced-apart intermediate portions 12a, 14a in various ways including, but not limited to, stitching and adhesives. Each internal passageway 16 is preferably filled with a resilient material 19 such as a flexible foam to provide various contours (i.e., shapes and configurations). Exemplary resilient materials 19 may include, but are not limited to polyurethane, polyester, polyester-urethane, polyetherurethane, natural or artificial rubber such as polybutadiene, polyisoprene, ethylene-propylene-diene terpolymers (EPDM), polyvinylchloride (PVC), polychroloprene, styrene/butadiene copolymer, or combinations thereof. As would be understood by those skilled in the art, additives, such as coupling agents, toughening agents, curing agents, antioxidants, reinforcing materials, and the like can be added to the resilient material to achieve desired characteristics. Dyes, pigments, fillers, anti-static agents, fire retardants, and scrim can also be added to the resilient material, as would be understood by those skilled in the art.

Referring now to FIG. 2, a vehicle passenger seat 20 incorporating a pair of contoured suspension members 10, 10' as described above is illustrated. The illustrated passenger seat 20 includes a seat frame 22 and a back rest frame 24. A first contoured suspension member 10 is attached to the seat frame 22 and a second contoured suspension member 10' is attached to the back rest frame 24.

The seat frame 22 is configured to be secured to a vehicle floor (not shown). As is understood by those skilled in the art, the seat 20 can be permanently mounted to a vehicle floor. Alternatively, the seat 20 can be mounted on movable slides 26 that are attached to a vehicle floor and that enable the seat 20 to be adjusted forward and rearward relative to a vehicle within which the seat 20 is mounted. The back rest frame 24 can be pivoted relative to the seat frame 22 in a manner well known to those of skill in the art.

Figure 4:
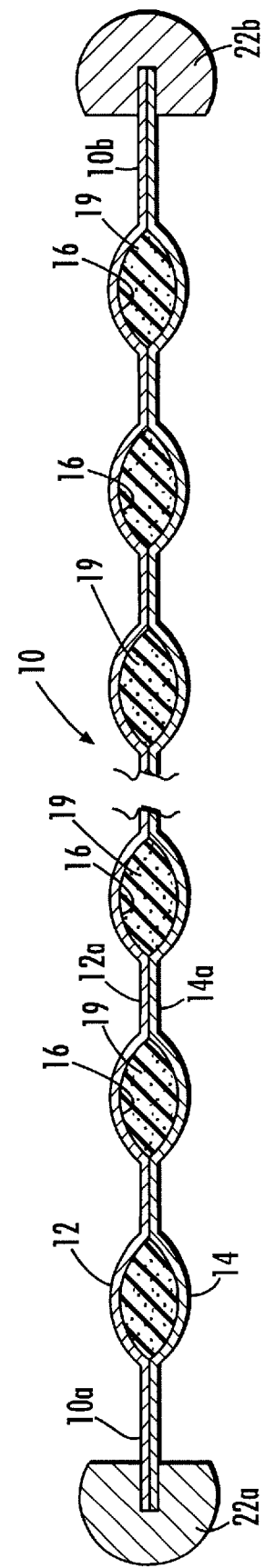
FIG. 4 is a side section view of a contoured suspension member according to the present invention wherein the contoured suspension member is secured between opposing members of a passenger seat frame.

Referring now to FIGS. 3 and 4, attachment of a contoured suspension member 10 according to the present invention will now be described. Because the contoured suspension members 10 and 10' are substantially identical in construction, only suspension member 10 will be described in detail with respect to attachment to a seat frame.

As illustrated in FIG. 3, edge portions 10a and 10b of the contoured suspension member 10 are tightly drawn around and secured to opposing members 22a, 22b of the seat frame 22. The edge portions 10a and 10b may be secured to the seat frame opposing members 22a, 22b in various ways that are well known to those skilled in the art and will not be described herein.

As illustrated in FIG. 4, edge portions 10a and 10b of the contoured suspension member 10 are tightly drawn between opposing members 22a, 22b of the seat frame 22. The edge portions 10a and 10b may be held by the seat frame opposing members 22a, 22b in various ways that are well known to those skilled in the art and will not be described further herein.

Figure 5:
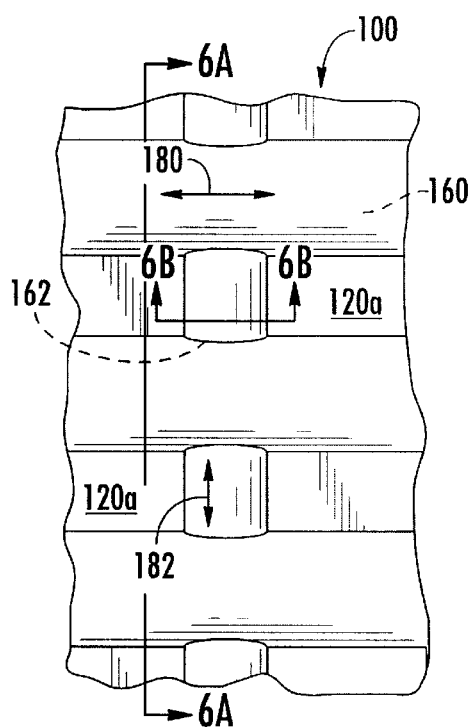
FIG. 5 is a partial plan view of a contoured suspension member according to another embodiment of the present invention.
Figure 6A:
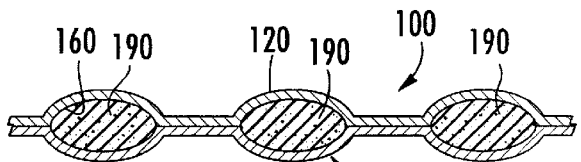
FIG. 6A is a section view of the contoured suspension member of FIG. 5 taken along lines 6A—6A.
Figure 6B:
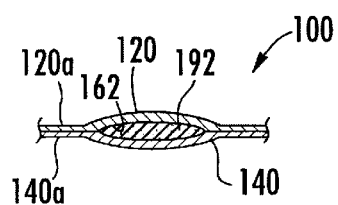
FIG. 6B is a section view of the contoured suspension member of FIG. 6A taken along lines 6B—6B.

Referring now to FIG. 5, a contoured suspension member 100 according to another embodiment of the present invention is illustrated. The resilient, contoured suspension member 100 includes first and second fabric panels 120, 140 joined together, preferably along respective perimeters thereof by weaving together. Preferably the first and second fabric panels are double woven together. The first and second fabric panels 120, 140 may be joined together along respective perimeters thereof in various ways including, but not limited to, stitching and adhesives. The first and second fabric panels 120, 140 are preferably formed from respective sets of flat-woven fibers as described above. These sets may be similar or different as described above.

In the illustrated embodiment, the first and second fabric panels 120, 140 are also joined together along spaced-apart intermediate portions 120a, 140a thereof to form first and second sets of internal passageways 160, 162. Each internal passageway 160, 162 in the respective first and second sets extends along a respective first and second direction as indicated by arrows 180, 182. In the illustrated embodiment, the first and second directions are substantially orthogonal. However, it is understood that the first and second sets of internal passageways 160, 162 may extend in various directions without limitation.

As described above with respect to FIGS. 1A and 1B, the first and second fabric panels 120, 140 may be double woven together along the spaced-apart intermediate portions 120a, 140a or by stitching and adhesives as described above. Each internal passageway 160 and 162 is preferably filled with a respective resilient material 190, 192 such as a flexible foam to provide various contours (i.e., shapes and configurations).

Exemplary resilient materials 190, 192 may include, but are not limited to, polyurethane, polyester, polyester-urethane, polyetherurethane, natural or artificial rubber such as polybutadiene, polyisoprene, ethylene-propylene-diene terpolymers (EPDM), polyvinylchloride (PVC), polychroloprene, styrene/butadiene copolymer, or combinations thereof. As would be understood by those skilled in the art, additives, such as coupling agents, toughening agents, curing agents, antioxidants, reinforcing materials, and the like can be added to the resilient material to achieve desired characteristics. Dyes, pigments, fillers, anti-static agents, fire retardants, and scrim can also be added to the resilient material, as would be understood by those skilled in the art.

Figure 7:
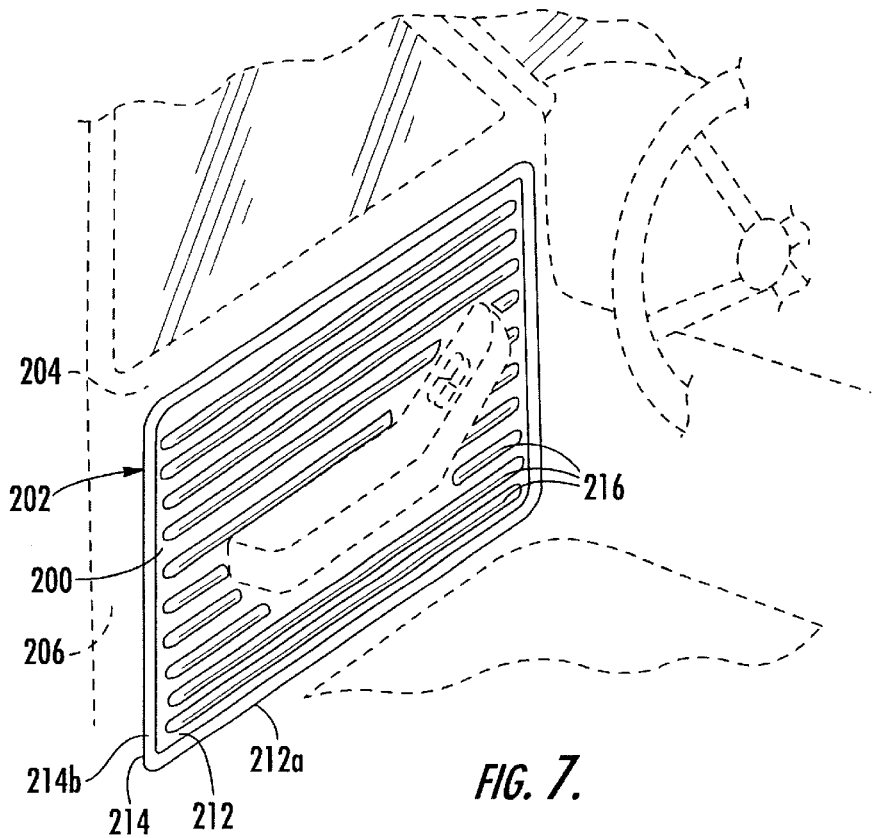
FIG. 7 illustrates an interior panel for a vehicle door incorporating a contoured suspension member according to the present invention.

Referring now to FIG. 7, a contoured member 200 according to another embodiment of the present invention is illustrated. The illustrated contoured member 200 is embodied as an interior trim panel 202 for a vehicle door 204. The illustrated contoured member 200 is formed as described above wherein first and second fabric panels 212, 214 are joined together along respective perimeters 212a, 214b thereof. A plurality of internal passageways 216 formed therein as described above are arranged in an aesthetically pleasing pattern. Each of the internal passageways 216 is filled with a resilient material such as flexible foam (not shown) to provide various contours (i.e., shapes and configurations).

Exemplary resilient materials may include, but are not limited to, polyurethane, polyester, polyester-urethane, polyetherurethane, natural or artificial rubber such as polybutadiene, polyisoprene, ethylene-propylene-diene terpolymers (EPDM), polyvinylchloride (PVC), polychroloprene, styrene/butadiene copolymer, or combinations thereof. As would be understood by those skilled in the art, additives, such as coupling agents, toughening agents, curing agents, antioxidants, reinforcing materials, and the like can be added to the resilient material to achieve desired characteristics. Dyes, pigments, fillers, anti-static agents, fire retardants, and scrim can also be added to the resilient material, as would be understood by those skilled in the art.

The illustrated interior trim panel 202 is attached directly to an interior surface 206 of the vehicle door 204. Accordingly, a rigid structural member is not required to secure the trim panel 202 to the inside of the vehicle door.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An interior trim panel for a vehicle door, comprising;

a contoured member, comprising:

first and second fabric panels;

wherein the first and second fabric panels are joined together in contacting relationship along respective perimeters thereof;

wherein the first and second fabric panels are joined together in contacting relationship along spaced-apart intermediate portions thereof in first and second transverse directions to form a first set of continuous internal passageways that extend in the first direction, and a second set of continuous internal passageways that extend in the second direction and that internally communicate with the first set of continuous internal passageways; and wherein each internal passageway in the first and second sets is completely filled with resilient material selected from the group consisting of polyurethane, polyester, polyester-urethane, polyetherurethane polybutadiene, polyisoprene, ethylene-propylene-diene terpolymers, polyvinylchloride, polychroloprene, styrene/butadiene copolymer, or combinations thereof.

2. An interior trim panel according to claim 1 wherein the first fabric panel is formed from a first set of flat-woven fibers.

3. An interior trim panel according to claim 2 wherein the first set of flat-woven fibers comprises mono-filament and conventional fibers.

4. An interior trim panel according to claim 1 wherein the second fabric panel is formed from a second set of flat-woven fibers.

5. An interior trim panel according to claim 4 wherein the second set of flat-woven fibers comprises mono-filament and conventional fibers.

6. An interior trim panel according to claim 1 wherein the first and second fabric panels are double woven along respective perimeters thereof.

7. An interior trim panel according to claim 1 wherein the first and second fabric panels are double woven along the spaced-apart intermediate portions thereof to form the first set of internal passageways.

* * * * *